United States Patent [19]

Savins

[11] 4,008,766
[45] Feb. 22, 1977

[54] OIL RECOVERY BY WATERFLOODING EMPLOYING A BIOPOLYMER-SURFACTANT SYSTEM

[75] Inventor: Joseph George Savins, Dallas, Tex.

[73] Assignee: Mobil Oil Corporation, New York, N.Y.

[22] Filed: Mar. 1, 1976

[21] Appl. No.: 662,473

[52] U.S. Cl. .............................. 166/273; 166/274; 252/8.55 D
[51] Int. Cl.² ...................................... E21B 43/22
[58] Field of Search .......................... 166/273–275, 166/305 R; 252/8.55 D

[56] References Cited
UNITED STATES PATENTS

| | | | |
|---|---|---|---|
| 3,332,486 | 7/1967 | McGhee ................. | 166/274 |
| 3,474,864 | 10/1969 | Hurd ..................... | 166/273 |
| 3,659,650 | 5/1972 | Stratton ................. | 166/275 |
| 3,719,606 | 3/1973 | Froning et al. ......... | 166/275 X |
| 3,792,731 | 2/1974 | Feuerbacher et al. ... | 166/274 |
| 3,799,264 | 3/1974 | Cardenas et al. ....... | 166/275 |
| 3,801,502 | 4/1974 | Hitzman ................ | 166/275 X |
| 3,811,504 | 5/1974 | Flournoy et al. ....... | 166/273 |
| 3,811,505 | 5/1974 | Flournoy et al. ....... | 166/273 X |
| 3,827,497 | 8/1974 | Dycus et al. ............ | 166/274 |
| 3,908,760 | 9/1975 | Clampitt et al. ........ | 166/246 |

OTHER PUBLICATIONS

Foster, W. R., "A Low-Tension Waterflooding Process", Journal of Petroleum Technology, Feb. 1973, vol. 25, pp. 205–210.
McCutcheon, J. W., "Surfactants Listed...", Reprint from "Soap & Chemical Specialties" Dec. 1957, Jan.–Apr., 1958, p. 30.

*Primary Examiner*—Stephen J. Novosad
*Attorney, Agent, or Firm*—C. A. Huggett; William D. Jackson

[57] ABSTRACT

A process for the recovery of oil from subterranean oil reservoirs by waterflooding employing a multicomponent anionic-nonionic surfactant system in combination with a Xanthomonas polysaccharide thickening agent. The surfactant system and polysaccharide provide for an enhanced thickening action in the injected aqueous liquid at relatively low shear rates. The anionic surfactant employed is an amide-linked sulfonate and the nonionic component is a polyethylene oxide type surfactant.

11 Claims, 3 Drawing Figures

OIL RECOVERY BY WATERFLOODING EMPLOYING A BIOPOLYMER-SURFACTANT SYSTEM

BACKGROUND OF THE INVENTION

This invention relates to the recovery of oil from subterranean oil reservoirs and more particularly to improved waterflooding operations employing a mixture of a biopolymer and a multicomponent surfactant system for mobility control.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood. For example, a paper by W. R. Foster entitled "A Low-Tension Waterflooding Process", Journal of Petroleum Technology, Vol. 25, Feb. 1973, pp. 205–210, describes a promising technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer in a graded concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

One limitation encountered in waterflooding with anionic surfactants such as petroleum sulfonates is the tendency of the surfactants to precipitate from solution in the presence of even moderate concentrations of divalent metal ions such as calcium and magnesium ions. Thus, as taught for example in the Foster paper, the surfactant slug may be preceded by a protective slug which functions to displace the reservoir waters ahead of the subsequently injected surfactant slug. Another limitation imposed upon the use of anionic surface-active agents resides in the fact that desired low interfacial tensions can seldom be achieved, even in the absence of divalent metal ions, at salinities significantly in excess of 2 or 3 weight percent. Thus, the protective slug and the surfactant slug normally exhibit a relatively low salinity.

In view of the limitations imposed by the salinity characteristics of many reservoir waters and field waters available for injection purposes, various surfactant systems have been proposed for use in moderately to highly saline systems which may or may not contain significant quantities of divalent ions. For example, U.S. Patent Application Serial No. 560,289, filed Mar. 20, 1975 by Silvia C. Birk, discloses a low tension waterflooding process employing an anionic-nonionic surfactant system capable of achieving low oil-water interfacial tensions in systems exhibiting salinities within the range of 3 to 25 weight percent and in the presence of divalent ions ranging as high as 3 weight percent. The multicomponent surfactant system employed in the Birk process comprises an amide-linked sulfonate such as a disubstituted taurate containing a $C_{12}$ to $C_{20}$ aliphatic group and a nonionic surfactant component such as a polyethoxylated alkyl phenol or a polyethoxylated aliphatic alcohol.

As noted previously, it is a common expedient to employ polymeric thickening agents in a waterflood process in order to provide for mobility control. Many polymeric thickening agents have been proposed for use in this regard. One well known group of polymers which may be employed is the polysaccharide produced by the action of the genus Xanthomonas on carbohydrates. For example, U.S. Pat. No. 3,908,760 to Clampitt et al. discloses the use of such polysaccharides in the presence of polyvalent metal ions which act as complexing agents. Another thickened waterflooding process employing Xanthomonas polysaccharides is disclosed in U.S. Pat. No. 3,801,502 to Hitzman. In this process the viscosity yield of the polysaccharide thickening agents is increased by employing an additive selected from the class consisting of certain alcohols, ketones, phenols, and nonionic surfactants such as ethoxylated alcohols and ethoxylated alkyl phenols.

SUMMARY OF THE INVENTION

In accordance with the present invention there is provided a new and improved waterflooding process in which at least a portion of the injected water is thickened by employing a Xanthomonas polysaccharide thickening agent in combination with a multicomponent anionic-nonionic surfactant system, the interaction between the mixed surfactant system and the polysaccharide providing for an even further enhanced thickening action at low shear rates as a result of a synergistic effect between the biopolymer and the surfactant mixture. In carrying out the invention, a thickened aqueous liquid containing a water dispersible polysaccharide produced by action of bacteria of the genus Xanthomonas on a carbohydrate and a multicomponent anionic-nonionic surfactant system is injected into an oil-bearing reservoir via a suitable injection system. The surfactant system comprises a nonionic surfactant characterized by the formula:

$$R\text{-}(OCH_2CH_2)_nOH \qquad (1)$$

wherein R is an aliphatic group or an aliphatic substituted aryl group and n is a number equal to or greater than 3, and an anionic surfactant characterized by the formula:

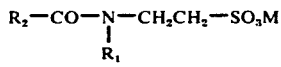
(2)

wherein $R_1$ is a methyl or ethyl group,
$R_2$ is an aliphatic group containing 12 to 20 carbon atoms, and
M is an alkali metal or ammonium ion.

Subsequent to the injection of the thickened aqueous liquid, an aqueous flooding medium is injected into the reservoir via the injection system in order to displace reservoir oil to a spaced production system from which the oil is recovered.

In a preferred embodiment of the invention, the weight ratio of the anionic surfactant to the nonionic surfactant in the thickened aqueous liquid is within the range of 0.3 – 3 and the ratio of the number of aliphatic carbon atoms in the nonionic surfactant to the number of ethylene oxide groups in the nonionic surfactant is within the range of 0.8 – 1.5.

In a further aspect of the invention, the concentration of the multifunctional surfactant system in the aqueous liquid is varied in order to vary the viscosity of the liquid. Preferably the concentration of the surfactant system is progressively decreased in a terminal portion of the aqueous liquid in order to grade the viscosity of the liquid downwardly to a terminal viscosity near that of the subsequently injected flooding medium.

DESCRIPTION OF SPECIFIC EMBODIMENTS

Figure 1:
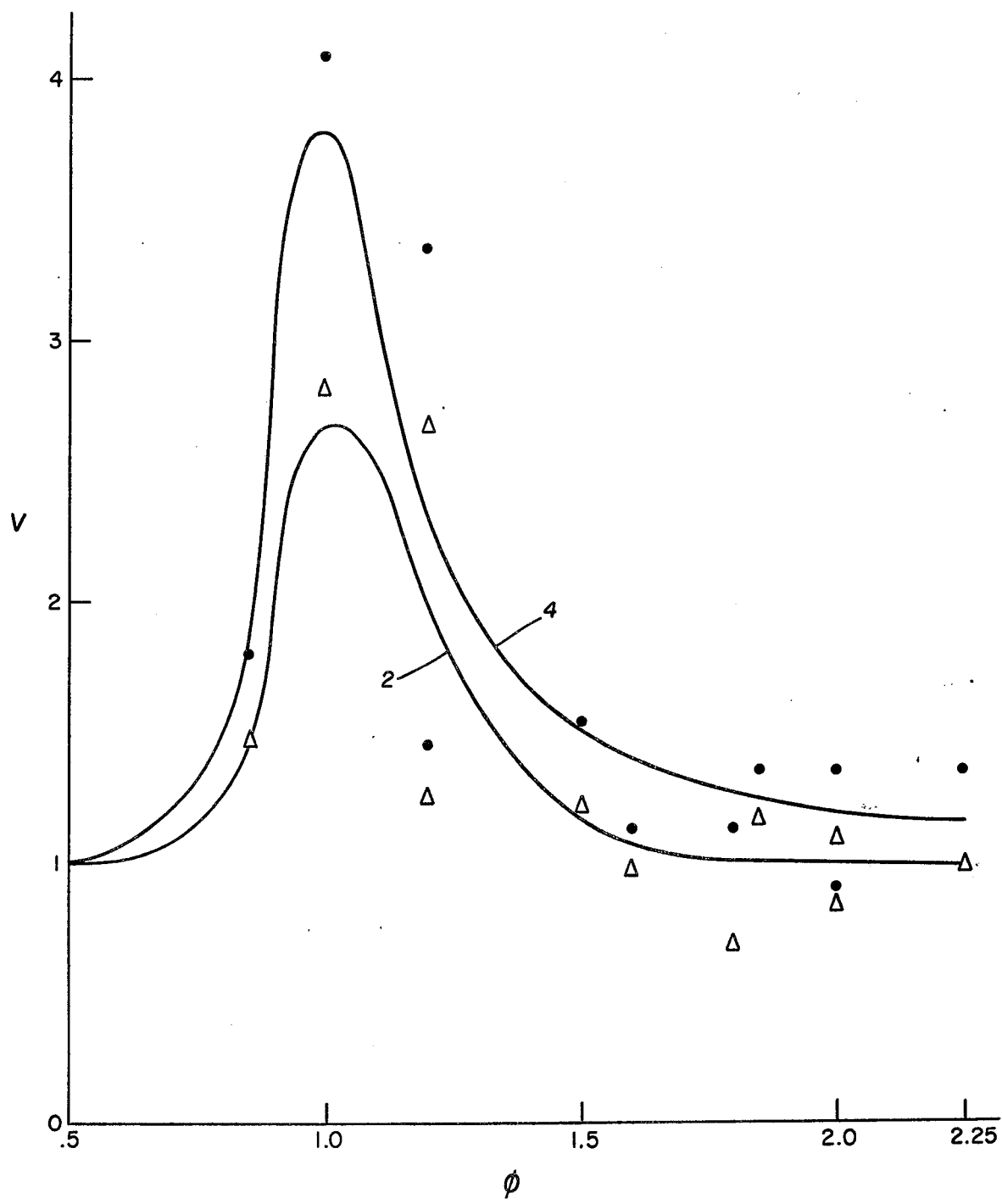
FIGS. 1 and 2 are graphs illustrating the relationship between the viscosity yield of the polysaccharide-mixed surfactant systems and the ratio of the number of aliphatic carbon atoms in the nonionic surfactant to the number of ethylene oxide groups in the nonionic surfactant.

As noted previously, polysaccharides produced by action of bacteria of the genus Xanthomonas are employed in various mobility control applications in waterflood oil recovery processes. Such polysaccharides and their methods of preparation and use are well known to those skilled in the art as disclosed, for example, in the aforementioned patents to Hitzman and Clampitt et al. Representative species of the genus Xanthomonas which may be employed to produce the polysaccharides include *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum* and *Xanthomonas vesicatoria*. A particular polysaccharide which is commercially available and is preferred for use in the present invention is the anionic polysaccharide B-1459 produced by fermentation of glucose with the bacterium *Xanthomonas campestris* NRRL B-1459 USDA. This polysaccharide is produced by culturing the bacterium *Xanthomonas campestris* in a well aerated medium having a pH of about 7 and which contains commercial glucose, organic nitrogen sources, dipotassium hydrogen phosphate, and appropriate trace elements. This polymer is available from the Kelco Company (a division of Merck Incorporated) under the trade name "Kelzan".

The concept of interacting such polymers with other additives in order to increase their viscosity yield is well known to those skilled in the art. In most cases, trivalent metal ions such as chromium and aluminum ions have been employed as complexing agents as disclosed in the patent to Clampitt et al. An alternative procedure proposed in the aforementioned patent to Hitzman involves the addition of various organic materials including nonionic surfactants such as ethoxylated alkyl phenols and alcohols.

The present invention results from the discovery that by employing a multifunctional surfactant system comprising a mixture of certain nonionic and anionic surfactants a rheosynergistic phenomenon results which has the effect of increasing the low shear rate viscosity of the system to a level higher than that characteristic of either the biopolymer system alone or the surfactant mixture alone. As will be understood by those skilled in the art, because of the radial flow geometry associated with the flow of fluids to or from a well, the flow velocity and thus the shear rate are extremely high immediately adjacent the well and relatively low at the more remote locations in the reservoir. Typically, the shear rate of a polymer solution throughout most of the intermediate portion of the reservoir between the injection and production wells is on the order of about one second$^{-1}$. Xanthomonas polysaccharides like many other polymeric thickening agents are shear thinning. Thus aqueous solutions of the polysaccharides exhibit relatively low viscosities at the shear rates encountered immediately adjacent an injection well with the viscosity progressively increasing as the polysaccharide solution moves away from the well and into the intermediate portion of the reservoir where it flows under low shear rate conditions. Thus the viscosities at these relatively low shear rates are of the greatest significance in regard to mobility control of the injected fluid.

The nonionic and anionic surfactants employed in conjunction with the Xanthomonas polysaccharide in accordance with the present invention are of the type disclosed in the aforementioned application by Birk. The nonionic surfactants are of the polyethylene oxide type in which the hydrophobic base is provided by an aliphatic group or an aliphatic substituted aryl group. The aliphatic groups or substituents may contain from 5 to 20 carbon atoms depending upon the polyethylene oxide content. The aryl component may be mononuclear or polynuclear (containing up to 3 rings) and will contain one or more aliphatic substituents. As a practical matter, the aryl component normally will be mononuclear simply from the standpoint of economy and product availability. The aliphatic group or aliphatic substituent may be unsaturated and/or contain branch chains but usually will take the form of normal alkyl groups. These surfactants as described above may be characterized by the formula:

 (1)

where R is an aliphatic group or an aliphatic substituted aryl group and $n$ is a number equal to or greater than 3.

The anionic surfactants are disubstituted taurates characterized by the formula:

$$R_2-CO-N-CH_2CH_2-SO_3M \qquad (2)$$
$$\phantom{R_2-CO-N}|$$
$$\phantom{R_2-CO-}R_1$$

wherein $R_1$ is a methyl or ethyl group,
$R_2$ is an aliphatic group containing 12 to 20 carbon atoms, and
M is an alkali metal or ammonium ion.

Disubstituted taurates of this type are available from the General Aniline and Film Corporation under the trade name "Igepon". Preferred anionic surfactants are sodium n-methyl-N-oleoyl-taurate, available under the trade name "Igepon T-33", and sodium N-methyl-N-(tall oil acyl)-taurate, available under the trade name "Igepon TK-32". As disclosed in the aforementioned Birk application, mixtures of these nonionic and anionic surfactants can be formulated to achieve low oil-water interfacial tensions in aqueous solutions exhibiting intermediate to high salinities within the range of 3 – 25 weight percent and in divalent metal ion concentrations of up to 3 weight percent. For a more detailed description of these anionic-nonionic surfactant systems and their use in achieving low oil-water interfacial tensions in waterflooding, reference is made to the aforementioned Birk application.

The rheosynergistic effect observed for the polysaccharide-multicomponent surfactant mixtures varies with the hydrophilic-hydrophobic balance of the nonionic surfactant and the relative amounts of anionic and nonionic surfactants in admixture with the Xanthomonas polysaccharide.

To demonstrate the effect of the hydrophilic-hydrophobic balance of the nonionic surfactant component of the polysaccharide-surfactant systems of the present invention, comparative laboratory experiments were carried out to determine the viscosities of a number of multicomponent surfactant systems in a brine solution with a Xanthomonas polysaccharide. In each test the anionic surfactant employed was sodium N-methyl-N-oleoyl-taurate marketed under the trade name "Igepon T-33" and the polysaccharide was the *Xanthomonas campestris* polysaccharide marketed under the trade name "Kelzan". The brine solution employed was a 6.07 weight percent mixed brine containing 3.90 weight percent sodium chloride, 1.55 weight percent calcium chloride, and 0.62 weight percent magnesium chloride. The nonionic surfactants employed in these laboratory experiments are set forth in Table I and identified by a code letter, the trade name, and chemical formula. In addition, Table I sets forth the hydrophilic-hydrophobic balance of each surfactant as expressed by the ratio, $\phi$, of the number of aliphatic carbon atoms in the nonionic surfactant to the number of ethylene oxide groups. The "Igepal" and "Emulphogene" surfactants are available from General Aniline and Film Corporation. As indicated by the chemical formulas in Table I, the Igepal surfactants are ethoxylated alkyl phenols and the Emulphogene surfactant is an ethoxylated tridecyl alcohol.

TABLE I

| Code | Trade Name | | Formula | $\phi$ |
|---|---|---|---|---|
| A | Igepal | CO-430 | $C_9H_{19}C_6H_4O(CH_2CH_2O)_4H$ | 2.25 |
| B | " | CO-520 | $C_9H_{19}C_6H_4O(CH_2CH_2O)_5H$ | 1.8 |
| C | " | CO-530 | $C_9H_{19}C_6H_4O(CH_2CH_2O)_6H$ | 1.5 |
| D | " | CO-630 | $C_9H_{19}C_6H_4O(CH_2CH_2O)_9H$ | 1.0 |
| E | " | CO-710 | $C_9H_{19}C_6H_4O(CH_2CH_2O)_{10.5}H$ | 0.85 |
| F | " | CA-520 | $C_8H_{17}C_6H_4O(CH_2CH_2O)_5H$ | 1.6 |
| G | " | RC-520 | $C_{12}H_{25}C_6H_4O(CH_2CH_2O)_{6.5}H$ | 1.84 |
| H | " | RC-630 | $C_{12}H_{25}C_6H_4O(CH_2CH_2O)_{10}H$ | 1.2 |
| I | " | DM-530 | $(C_9H_{19})_2C_6H_3O(CH_2CH_2O)_9H$ | 2.0 |
| J | " | DM-710 | $(C_9H_{19})_2C_6H_3O(CH_2CH_2O)_{15}H$ | 1.2 |
| K | Emulphogene | BC-610 | $C_{13}H_{27}O(CH_2CH_2O)_{6.5}H$ | 2.0 |

In one suite of experiments, Kelzan was dispersed in the previously described brine solution at a concentration of 500 parts per million and the mixed surfactant system was added to provide a surfactant concentration of 0.8 weight percent. The ratio between the anionic and nonionic surfactant components was 1. Thus the nonionic and anionic components were each present in a concentration of 0.4 weight percent. After adding the polysaccharide and surfactants, each sample was then divided into two equal fractions. One fraction was aged at 77° F. while the other fraction was aged at 160° F. Each fraction was aged for at least 16 hours at the indicated temperature before the low shear rate viscosity was measured at 77° F. In the instance of the fraction aged at 160° F., the viscosity data reported refer to the fraction's viscosity after cooling from 160° F. to 77° F. As used here, the term "relative viscosity" is defined as the ratio of the viscosity of the mixture: biopolymer, anionic surfactant, nonionic surfactant, which exhibits the rheosynergistic effect, to the viscosity of the biopolymer solution, evaluated at the same shear rate. Viscosity measurements in each case were taken at a rotor speed of 1.5 rpm corresponding to a nominal shear rate of 1.7 sec$^{-1}$.

The results of this suite of experiments are set forth in Table II and also shown in FIG. 1. Referring first to Table II, the first column indicates by the appropriate code letter the nonionic component employed in the anionic-nonionic surfactant system. The second column presents the ratio $\phi$ for the nonionic surfactant and the third and fourth columns indicate, respectively, the relative viscosities observed by measurements taken at 77° F. on fractions aged at 77° F. and at 160° F. As indicated earlier, the relative viscosity is arrived at by dividing the viscosity of the Kelzan-mixed surfactant system by the corresponding viscosity observed for a system containing only Kelzan and the mixed brine. Thus the relative viscosity provides a measure of the enhanced viscosity yield obtained by employing the mixed surfactant system.

TABLE II

| | | Relative Viscosity | |
|---|---|---|---|
| Code | $\phi$ | Aged at 77° F. | Aged at 160° F. |
| A | 2.25 | 0.98 | 1.36 |
| I | 2.00 | 0.86 | 0.90 |
| K | 2.00 | 1.09 | 1.36 |
| G | 1.84 | 1.17 | 1.36 |
| B | 1.80 | 0.70 | 1.13 |
| F | 1.60 | 0.98 | 1.13 |
| C | 1.50 | 1.21 | 1.54 |
| H | 1.20 | 2.66 | 3.36 |
| J | 1.20 | 1.25 | 1.45 |
| D | 1.0 | 2.82 | 4.09 |
| E | 0.85 | 1.45 | 1.81 |

Turning now to FIG. 1, curves 2 and 4 are graphs of the data presented in Table II with the relative viscosity V plotted on the ordinate versus the ratio $\phi$ of the nonionic surfactant component of the system plotted on the abscissa. Curve 2 in FIG. 1 is a plot of the relative viscosities observed at 77° F. on fractions aged at 77° F., indicated by the symbol "Δ", and curve 4 is a plot of the relative viscosities observed at 77° F. on fractions aged at 160° F., indicated by the symbol "●".

While both curves 2 and 4 are interpolative, it can be seen from an examination of the data presented in FIG. 1 and in Table II that the rheosynergistic effect observed by the addition of the multicomponent surfactant system to the Kelzan solution varies with the value of the ratio $\phi$. In general the measurements at 77° F. on fractions aged at 77° F. (curve 2) show that the rheosynergistic effect does not appear to be consistent for values of $\phi$ which are greater than 1.5. The maximum rheosynergistic effect appears to occur for surfactant systems exhibiting a ratio $\phi$ of about 1 and then declines rapidly and does not appear to be significant for values of $\phi$ less than about 0.8. Thus from an examination of curve 2, the nonionic surfactant in the multicomponent surfactant system preferably should exhibit a value of $\phi$ within a range of 0.8 - 1.5, with a more preferred range of $\phi$ being 1.0 - 1.3.

The data presented in column 4 of Table II and illustrated by curve 4 of FIG. 1 indicates that on aging the fractions at temperatures more closely resembling the temperature conditions existing in many subterranean oil reservoirs, the range of $\phi$ over which the rheosynergistic effect is observed is improved in that it is somewhat broader. Also the effect appears to be consistently more pronounced; however, the maximum still appears to occur at a ratio $\phi$ of about 1.

In a second suite of experiments, viscosity measurements were carried out on Kelzan and anionic-nonionic surfactant systems prepared as described previously to provide a Kelzan concentration of 500 parts per million and a surfactant concentration of 0.8 weight percent in a 6.07 weight percent brine. The anionic and nonionic surfactants were present in equal amounts. In these experiments, the polysaccharide-surfactant system was allowed to age in aqueous solution overnight at 160° F. and then cooled to 77° F. for the viscosity measurements. Viscosity measurements were carried out, as described previously, at a nominal shear rate of 1.7 sec$^{-1}$. In this suite of experiments, an attempt was made for each sample to identify an optically clear fraction as contrasted with a fraction which was cloudy or turbid, indicative of polymer agglomeration. The viscosity of the optically clear fraction was then measured separately and compared with the viscosity of the full sample. The full sample viscosity measurements were taken after agitating the full sample, including the optically clear fraction, to obtain a homogeneous mixture.

Figure 2:
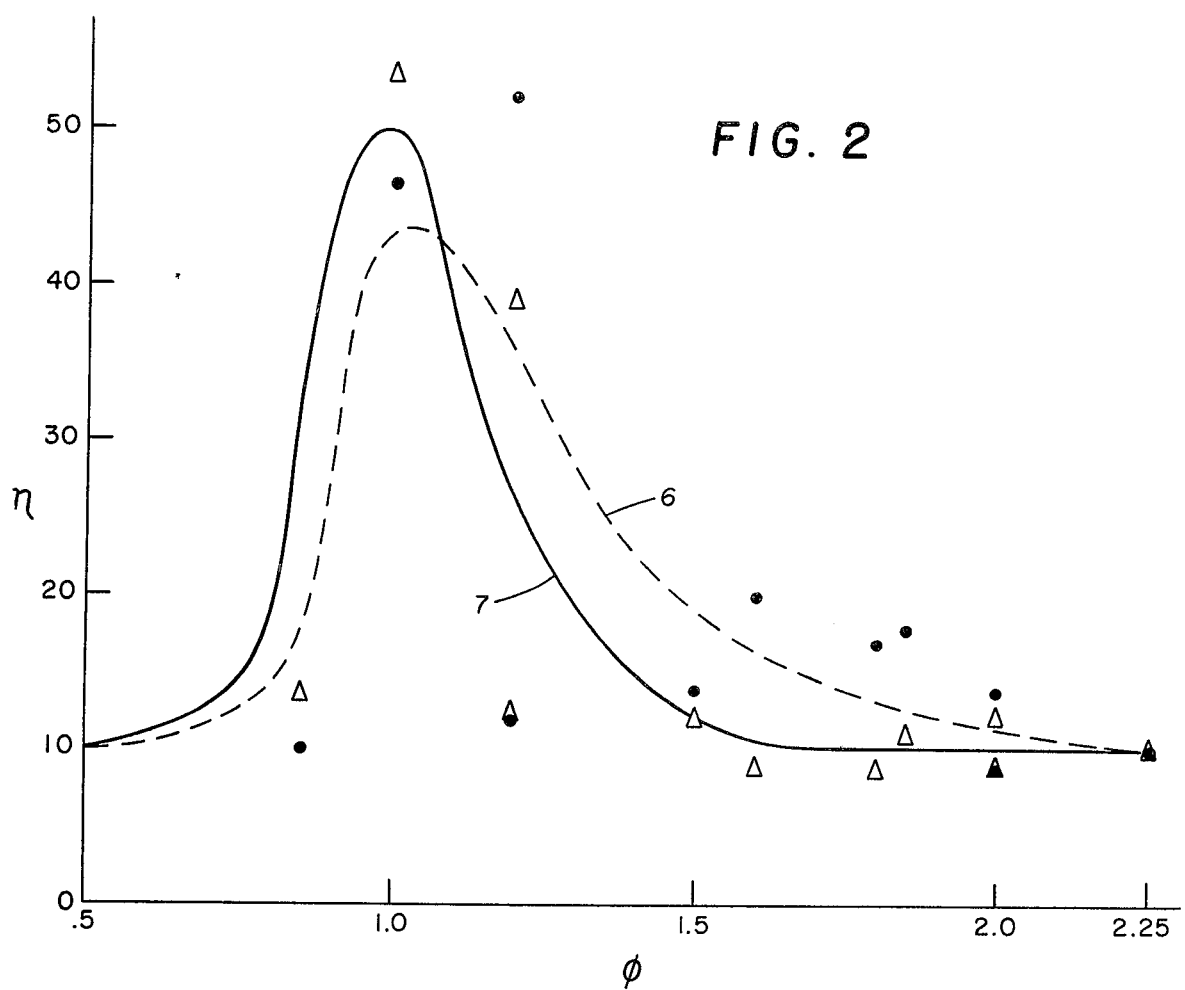

The results of this suite of experiments are presented in Table III and illustrated in FIG. 2. In Table III, columns 3 and 4 indicate, respectively, the viscosity in centipoises of the clear fraction and the full sample. Column 5 indicates the ratio of the viscosity of the clear fraction to the viscosity of the full sample.

TABLE III

| Code | $\phi$ | Viscosity, cp "Clear" Fraction | Viscosity, cp Full Sample | Viscosity Ratio (Clear Fraction) (Bulk Sample) |
|---|---|---|---|---|
| A | 2.25 | 10 | 10 | 1.00 |
| I | 2.00 | 8.8 | 8.8 | 1.00 |
| K | 2.00 | 14.0 | 12.0 | 1.16 |

TABLE III-continued

| Code | $\phi$ | Viscosity, cp "Clear" Fraction | Viscosity, cp Full Sample | Viscosity Ratio (Clear Fraction) (Bulk Sample) |
|---|---|---|---|---|
| G | 1.84 | 18.0 | 10.8 | 1.66 |
| B | 1.80 | 17.2 | 8.8 | 1.95 |
| F | 1.60 | 20.0 | 8.8 | 2.27 |
| C | 1.50 | 14.0 | 12.0 | 1.16 |
| H | 1.20 | 52.8 | 39.0 | 1.35 |
| J | 1.20 | 12.0 | 12.8 | 0.93 |
| D | 1.00 | 46.4 | 53.2 | 0.87 |
| E | 0.85 | 10.0 | 13.6 | 0.73 |
| Kelzan | | | 10.0 | |

In FIG. 2, curves 6 and 7 are graphs of the viscosity $\eta$ measured for the clear fraction and full sample, respectively, plotted on the ordinate versus the ratio $\phi$ for the nonionic surfactant component plotted on the abscissa. The clear fraction data points are indicated by the symbol "●" and the full sample data points are indicated by the symbol "Δ". It can be seen that curves 6 and 7 in FIG. 2 conform generally in shape to the curves shown in FIG. 1 with curve 6 illustrating the clear fraction viscosities presenting a somewhat broader range of $\phi$ throughout which the rheosynergistic effect is noted. However, an examination of the data presented in Table III, and particularly the clear fraction viscosities given in column 3 and the viscosity ratios presented in column 5, indicates that the rheosynergistic effect for the clear fraction declines abruptly for values of $\phi$ of less than 1. Thus it normally will be preferred to employ a nonionic surfactant component which exhibits a ratio $\phi$ of no less than 1. This is particularly significant if the invention is to be carried out in a relatively low permeability reservoir which may be susceptible to plugging because of polymer agglomeration.

Figure 3:
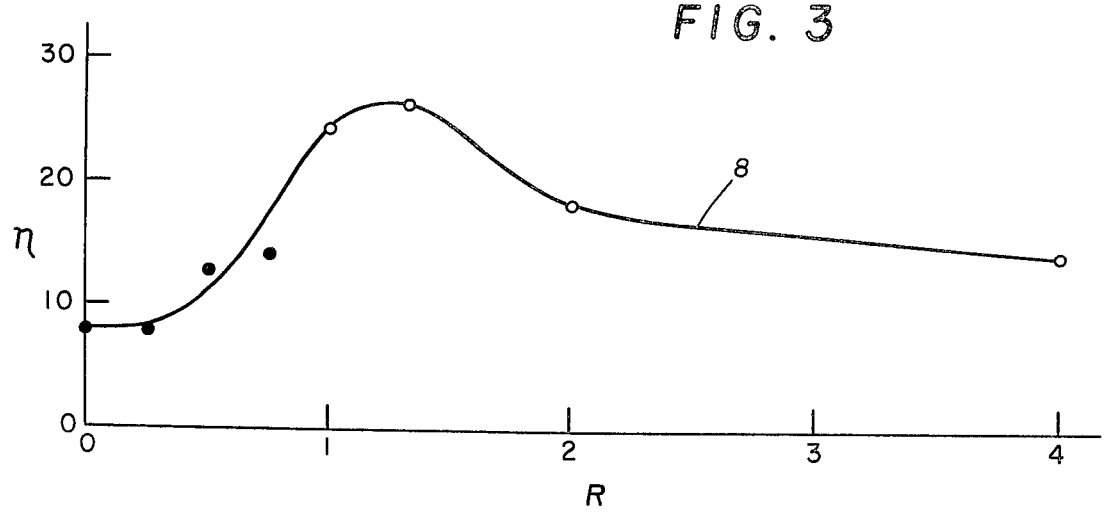
FIG. 3 is a graph illustrating the relationship between the viscosity yield of the polysaccharide-mixed surfactant system and the weight ratio of the anionic surfactant to the nonionic surfactant.

A third suite of experiments was carried out in order to demonstrate the effect upon viscosity of the relative amounts of the anionic and nonionic surfactants in the system. In this set of experiments, the Kelzan concentration was held constant at 500 parts per million in the 6.07 weight percent mixed brine solution. The anionic surfactant (Igepon T33) and the nonionic surfactant (Igepal CO-630) were employed in different relative and absolute amounts. Each sample of the polysaccharide-surfactant system was aged 16 hours at a temperature of 160° F. The viscosities were then measured at a temperature of 77° F. and, as described previously, at a nominal shear rate of 1.7 sec$^{-1}$. The results of this suite of experiments are illustrated in FIG. 3 in which curve 8 is a plot of the low shear rate viscosity, $\eta$, on the ordinate versus the ratio, R, of the anionic to the nonionic surfactant on the abscissa. In FIG. 3, the data points indicated by the symbol "●" represent a system in which the nonionic surfactant was present in a concentration of 0.4 weight percent with the anionic surfactant concentration varied to give the ratio indicated on the abscissa, and the data points indicated by the symbol "o" represent systems in which the anionic surfactant component was present in a concentration of 0.4 weight percent and the nonionic component was varied as necessary to give the ratio indicated. Thus, the total surfactant concentration employed in these tests varied from a low of 0.4 weight percent (corresponding to an R value of zero) to 2.0 weight percent (corresponding to an R value of 4). From examination of curve 8 in FIG. 3, it can be seen that the solution viscosity increases with increasing relative anionic surfactant concentration until it reaches a maximum at a value of R about 1.3 and thereafter decreases, notwithstanding that the total surfactant concentration continues to increase. Preferably, the anionic surfactant to nonionic weight ratio, R, is within the range of 0.3 – 3. In most cases it will be preferred to employ a more evenly balanced mixture with the ratio of anionic to nonionic surfactant being within the range of 0.8 – 1.8.

In a further aspect of the invention, the surfactant concentration may be varied as the aqueous solution of surfactant and polysaccharide is injected into the formation in order to vary the low shear rate viscosity thereof. This spatial gradation of surfactant concentration, with or without gradation of biopolymer concentration, may be employed in conjunction with the prior injection of a surfactant slug as described hereinafter or without prior surfactant injection. In the latter case, the front portion of the mobility control slug will initially present both a favorable mobility ratio and a low oil-water inferfacial tension region. As disclosed in the aforementioned paper by Foster, it is a conventional practice to provide a decreasing graded concentration of polymer in a mobility control slug in order to grade the slug viscosity from a maximum viscosity at the interface with the low tension slug to a terminal viscosity near that of the following drive water. Another procedure disclosed in application Ser. No. 522,081, filed Nov. 7, 1974 by Harry L. Chang, involves grading of both the leading and trailing edges of the mobility control slug. In this procedure, the viscosity of the mobility control slug is graded at its leading and trailing edges between the viscosity of water and a maximum viscosity at least as great as the viscosity of the reservoir oil. This may be accomplished by progressively increasing the concentration of the polymeric thickening agent to a maximum value at its leading edge and then decreasing the concentration to zero at its trailing edge. The thickening agent concentration may be increased and decreased linearly or nonlinearly by increments. In the present invention, viscosity gradation in the trailing edge of the mobility control slug can be accomplished by progressively decreasing the concentration of the multicomponent surfactant system as the terminal portion of the mobility control slug is injected into the reservoir. Gradation of the surfactant concentration may be carried out concomitantly with or in lieu of gradation of the biopolymer concentration. For example, the biopolymer concentration may be graded only at the trailing edge of the mobility control slug or at both the leading and trailing edges. The surfactant system concentration in the mobility control slug may be progressively decreased along with the biopolymer concentration in order to ultimately arrive at a terminal viscosity of the following drive water. If viscosity gradation is desired at the leading edge of the mobility control slug, this normally will be accomplished by progressively increasing only the biopolymer concentration. The surfactant concentration may remain constant or as noted hereinafter may be decreased from the concentration present in a previously injected surfactant slug.

As is well known to those skilled in the art, chemical additives such as polymers and surfactants employed in waterflooding move through the reservoir by a chromatographic transport mechanism. Polymeric thickening agents such as the Xanthomonas polysaccharides employed in the present invention generally tend to move through the reservoir at a transport rate faster than surfactants. Thus it is a conventional practice, as noted in the previous reference to the aforementioned Foster paper, to inject a relatively low viscosity surfactant slug and then follow this with a viscous mobility control slug containing the polymeric thickening agent. This general injection format may also be followed in carrying out the present invention but with the modification wherein the multicomponent surfactant system is present in the subsequently injected mobility control slug as well as the surfactant slug. Thus in accordance with this embodiment of the invention, a surfactant slug comprising an aqueous solution of the previously described anionic-nonionic surfactant system is introduced into the reservoir via the injection system. The surfactant slug normally will contain no polymeric thickening agent or the polymer, if present, will be in a relatively low concentration such that the surfactant slug exhibits a relatively low viscosity. Thereafter the mobility control slug is injected. The mobility control slug contains the anionic-nonionic surfactant system and in addition a Xanthomonas polysaccharide such that it exhibits a viscosity greater than the viscosity of the surfactant slug. Thus as the mobility control and surfactant slugs are moved through the reservoir by the subsequently injected driving fluid, the relatively greater chromatographic transport rate of the polysaccharide will result in a polymer build up in the surfactant slug with the attendant rheosynergistic effect. In the various experiments carried out in regard to this invention, the concentration of biopolymer was 0.05 percent and the concentration of surfactant mixture varied between 0.4 and 2.0 percent. In actual operations the total concentrations may be somewhat different.

When the rheosynergistic phenomenon is applied in a manner such that the mixture of biopolymer, anionic surfactant, and nonionic surfactant is employed as a graded mobility control slug which follows a surfactant slug, the mobility control slug typically will be injected in an amount within the range of 0.1 to 0.4 pore volume. The preceding surfactant slug normally will be injected in an amount within the range of 0.1 to 0.3 pore volume and exhibit a surfactant concentration within the range of 1.5 to 5.0 weight percent as taught in the aforementioned Birk application. In most cases, at the front of the mobility control slug the concentration of biopolymer will not exceed 0.2 weight percent and the total surfactant concentration will not exceed 2.0 weight percent, with preferred concentration ranges of 0.025 – 0.1 weight percent for the biopolymer, and 0.1 – 1.0 weight percent for the surfactant mixture. The exact amounts will vary noting that in a graded mobility control slug the maximum viscosity occurs at the front and the minimum viscosity at the rear. Subsequent to the injection of the mobility control slug, an aqueous flooding medium is injected in order to drive the previously injected fluid through the formation. This flooding medium is injected in an amount as necessary to carry the displacement process to completion and may be any water, such as locally available field water, which is not incompatible with the reservoir formation.

When the rheosynergistic phenomenon is applied in a manner such that a single slug with dual graded interfacial tension/mobility control properties is injected, this slug normally is injected in an amount within the range of 0.1 – 1.0 pore volume. In this aspect of the invention, the surfactant concentration in the leading region of the slug preferably is within the range of 1.5 – 5.0 weight percent as specified previously in order to achieve the desired low interfacial tension, and the concentration of biopolymer is employed in a concentration sufficient to impart the desired mobility control viscosity to the low tension portion of the slug. In most cases, at the front of the slug the concentration of biopolymer will not exceed 0.2 weight percent and preferably will be within the range of 0.025 – 0.1 weight percent. In the graded mobility region where there is less emphasis on maintaining a low interfacial tension, preferred concentration ranges are 0.025 – 0.1 weight percent for the biopolymer, and 0.1 – 1.0 weight percent for the surfactant mixture.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in this patent. By the term "pore volume" as used herein, it is meant that volume of the portion of the formation underlying the well pattern employed, as described in greater detail in the Burdyn et al. patent.

I claim:
1. In the recovery of oil from a subterranean oil reservoir penetrated by spaced injection and production systems, the method comprising:
   a. introducing into said reservoir via said injection system a thickened aqueous liquid containing a water dispersible polysaccharide produced by action of bacteria of the genus Xanthomonas on a carbohydrate and a multifunctional surfactant system comprising a nonionic surfactant characterized by the formula:

wherein
   R is an aliphatic group or an aliphatic substituted aryl group and
   n is a number equal to or greater than 3, and
   an anionic surfactant characterized by the formula:

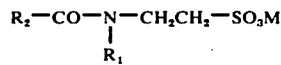

wherein
   $R_1$ is a methyl or ethyl group,
   $R_2$ is an aliphatic group containing 12 to 20 carbon atoms, and
   M is an alkali metal or ammonium ion,
   b. introducing into said reservoir via said injection system an aqueous flooding medium to displace reservoir oil to said production system, and
   c. recovering oil from said production system.

2. The method of claim 1 wherein the weight ratio of said anionic surfactant to said nonionic surfactant in said thickened aqueous liquid is within the range of 0.3 – 3.

3. The method of claim 1 wherein the weight ratio of said anionic surfactant to said nonionic surfactant in said thickened aqueous liquid is within the range of 0.8 – 1.8.

4. The method of claim 1 wherein the ratio of the number of aliphatic carbon atoms in said nonionic surfactant to the number of ethylene oxide groups in said nonionic surfactant is within the range of 0.8 – 1.5.

5. The method of claim 1 wherein the ratio of the number of aliphatic carbon atoms in said nonionic surfactant to the number of ethylene oxide groups in said nonionic surfactant is within the range of 1.0 – 1.3

6. The method of claim 1 wherein the concentration of said multifunctional surfactant system in said aqueous liquid is varied in order to vary the viscosity thereof.

7. The method of claim 1 wherein the concentration of said multifunctional surfactant system is decreased in a terminal portion of said thickened aqueous liquid.

8. The method of claim 1 wherein said polysaccharide is a polysaccharide produced by action of the bacterium Xanthomonas campestris.

9. The method of claim 8 wherein said anionic surfactant is selected from the group consisting of alkali metal and ammonium N-methyl-N-oleoyl-taurates and alkali metal and ammonium N-methyl-N-(tall oil acyl)-taurates.

10. In the recovery of oil from a subterranean oil reservoir penetrated by spaced injection and production sysems, the method comprising:
   a. introducing into said reservoir via said injection system a surfactant slug comprising an aqueous surfactant slug containing a multifunctional system comprising a nonionic surfactant characterized by the formula:

wherein
   R is an aliphatic group or an aliphatic substituted aryl group and n is a number equal to or greater than 3, and
   an anionic surfactant characterized by the formula:

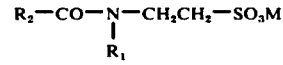

wherein
   $R_1$ is a methyl or ethyl group,
   $R_2$ is an aliphatic group containing 12 to 20 carbon atoms, and
   M is an alkali metal or ammonium ion,
   b. subsequent to step (a) introducing into said reservoir via said injection system an aqueous mobility control slug exhibiting a viscosity greater than the viscosity of said surfactant slug and containing a water dispersible polysaccharide produced by action of bacteria of the genus Xanthomonas on a carbohydrate and a multifunctional surfactant system comprised of nonionic and anionic surfactants of the types set forth in step (a),
   c. introducing into said reservoir via said injection system an aqueous flooding medium to displace reservoir oil to said production system, and
   d. recovering oil from said production system.

11. The method of claim 10 wherein said mobility control slug comprises a terminal portion in which the concentration of said multifunctional surfactant system is progressively decreased as said terminal portion is introduced into said reservoir.

* * * * *